United States Patent [19]

Baker

[11] Patent Number: 5,307,087

[45] Date of Patent: Apr. 26, 1994

[54] THREE-DIMENSIONAL RGB COMPONENT VECTOR DISPLAY

[75] Inventor: Daniel G. Baker, Aloha, Oreg.

[73] Assignee: Tektronix, Inc., Wilsonville, Oreg.

[21] Appl. No.: 3,907

[22] Filed: Jan. 13, 1993

[51] Int. Cl.[5] .......................................... H04N 17/02
[52] U.S. Cl. ..................................... 345/150; 345/904
[58] Field of Search ........................... 340/701; 358/10

[56]  References Cited

U.S. PATENT DOCUMENTS 4,635,094  1/1987  Thong .................................... 358/10

Primary Examiner—Alvin E. Oberley
Assistant Examiner—Vivian W. Chang
Attorney, Agent, or Firm—Francis I. Gray

[57] ABSTRACT

A three-dimensional display for characterizing red, green and blue components of a video signal combines the three components to form two pairs of combination signals, one pair combining the green and blue components and the other pair combining the green and red components. The two pairs of combination signals are input alternately to the inputs of a vector display device to provide a symmetrical display about an axis of symmetry where one half characterizes the blue component, the other half characterizes the red component, and both halves characterize the green component. A diamond-shaped graticule is displayed for each half of the symmetrical display to define a color gamut region for the red, green and blue components.

3 Claims, 6 Drawing Sheets

THREE-DIMENSIONAL RGB COMPONENT VECTOR DISPLAY

BACKGROUND OF THE INVENTION

The present invention relates to vectorscope displays, and more particularly to a three-dimensional RGB component vector display in the form of a diamond to simplify the interpretation of the characteristics of respective color components, red (R), green (G) and blue (B).

The "Lightning" display, as incorporated into the WFM300 Waveform Monitor manufactured by Tektronix, Inc. of Wilsonville, Oregon, United States of America, is a method for measuring characteristics of a component color video signal having a luminance component and two color difference components, commonly referred to as Y, Pb and Pr. This display is described in U.S. Pat. No. 4,635,094 issued Jan. 6, 1987 to Tran Thong entitled "Method and Apparatus for Measurement of Component Video Signal Characteristics Using an Oscilloscope." This display is formed by inputting one color component to one axis of a display and the luminance component to the other, and then inputting the other color component to the one axis and an inverted luminance component to the other on alternating lines of the active video portion of the video signal. This display, when driven by RGB color components is difficult to interpret. The Lightning display is designed for Y, Pb, Pr, and an RGB input is matrixed to Y, Pb, Pr. This difficulty in interpretation occurs since Y is composed of a combination of all three RGB components and delay or gain errors of any one component always affects Y and, therefore, the entire display. If the RGB components are not matrixed to Y, Pb, Pr, then the Lightning display is very confusing since there is no longer a direct relationship between the RGB input and the Y, Pb, Pr display axes. Also with a Y, Pb, Pr display the gamut limit boundaries are not clearly defined.

What is desired is an RGB component vector display that is easy to interpret and defines clear gamut limit boundaries.

SUMMARY OF THE INVENTION

Accordingly the present invention provides a three-dimensional RGB component vector display using a diamond shaped valid color gamut graticule to outline the valid color gamut for 100% amplitude signals. The RGB components are combined to form two pairs of combinations, (−G+B, G+B) and (−G+R, −G−R). Each pair is applied to the respective horizontal and vertical amplifiers of a display device to provide a symmetrical display, with the upper portion of the display being a function of the green and blue components and the lower portion of the display being a function of the green and red components. The RGB components within the valid gamut color space are contained within two diamond shaped patterns.

The objects, advantages and other novel features of the present invention are apparent from the following detailed description when read in conjunction with the appended claims and attached drawing.

DESCRIPTION OF THE PREFERRED EMBODIMENT

Figure 1:
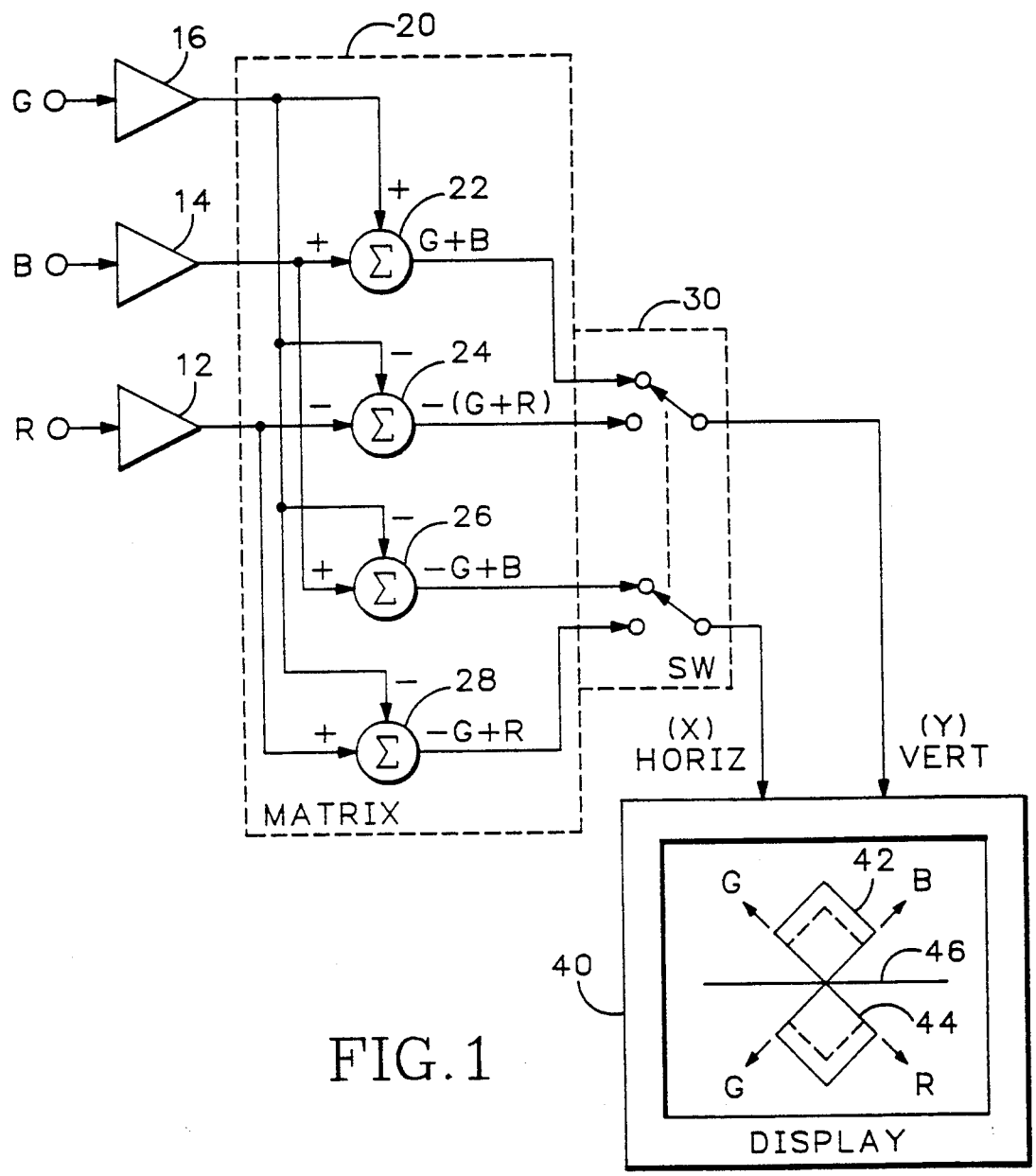
FIG. 1 is a block diagram view of a circuit for providing a three-dimensional RGB component vector display according to the present invention.

Referring now to FIG. 1 red (R), green (G) and blue (B) color component signals are input via respective buffer amplifiers 12, 14, 16 to a combination matrix 20. The combination matrix 20 has respective summing circuits 22, 24, 26, 28 to produce G+B, −(G+R), −G+B and −G+R signals from the RGB input signals. These combination signals are input to a switch 30 having four inputs and two outputs. The two outputs from the switch 30 are coupled to the respective horizontal and vertical amplifiers of a display device 40. The inputs are coupled to the outputs of the switch 30 such that in a first position of the switch the G+B signal is coupled to the vertical amplifier and the −G+B signal is coupled to the horizontal amplifier of the display device 40. In a second position of the switch 30 the −(G+R) signal is coupled to the vertical amplifier and the −G+R signal is coupled to the horizontal amplifier of the display device 40. The switch 30 alternates between the two positions at a rate equal to one half the horizontal line rate.

Figure 2:
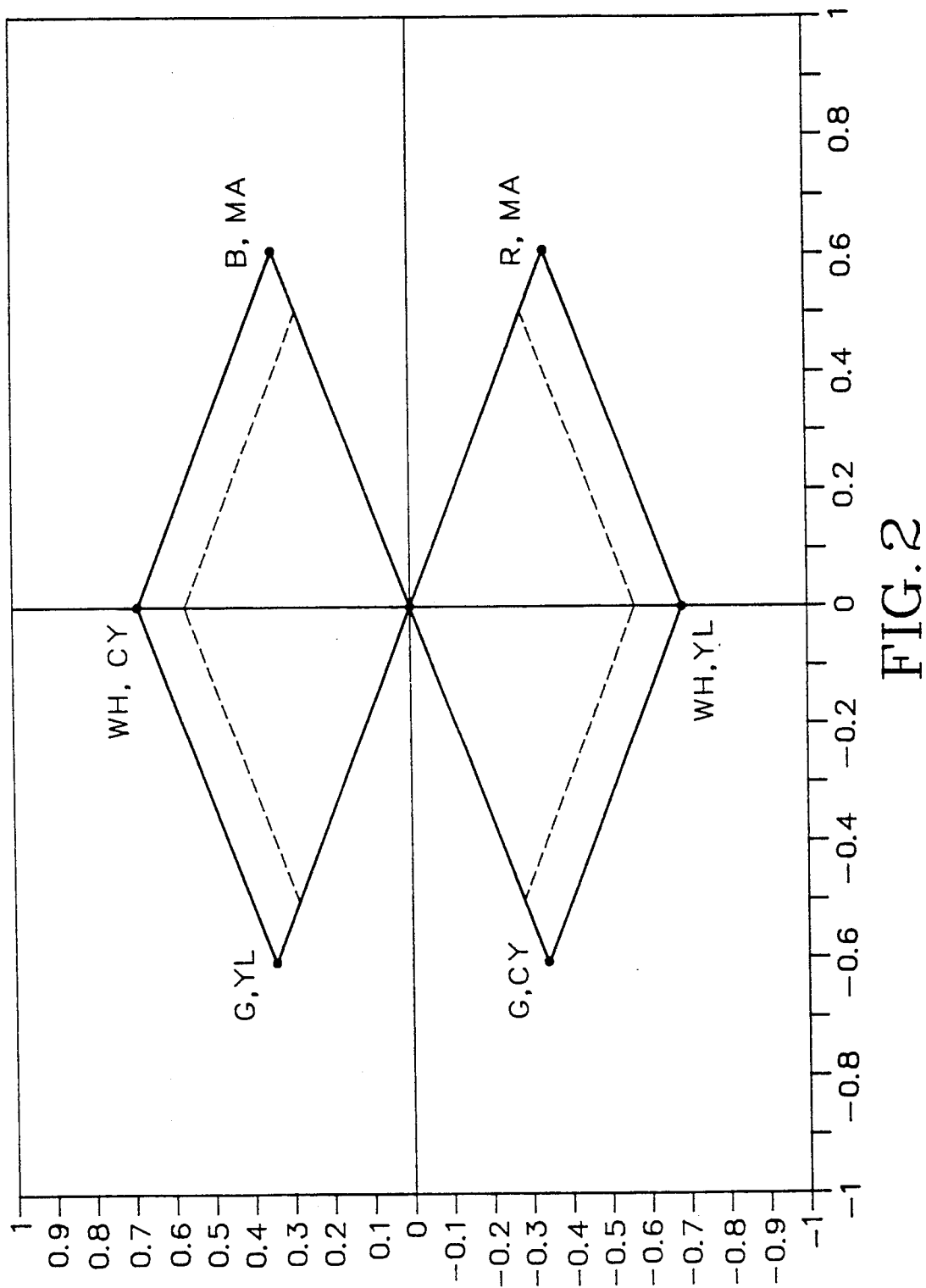
FIG. 2 is an illustration of a color gamut graticule for a display according to the present invention.

The result is that two diamond displays 42, 44 are shown on the display device 40 that are about an axis of symmetry 46. One display 42 is a combination of the green and blue components, and the other display 44 is a combination of the green and red components. Anomalies in delay and gain for the blue component affect one display 42, anomalies for the red component affect the other display 44, and anomalies for the green component affect both displays. A graticule, shown in FIG. 2, defines a valid color gamut space for the RGB components at 100% amplitude. An alternate graticule may also include a valid color gamut space at 75% amplitude as indicated by the dotted line in FIG. 2. Boxes defining the 100% level for specified colors are part of the graticule that define the corners of the respective diamond displays. Timing errors affect the transitions between the dots that represent the colors in a color bar signal. The dots nominally fall within the defined boxes of the graticule when such a color bar signal is applied at the input.

Figure 3:
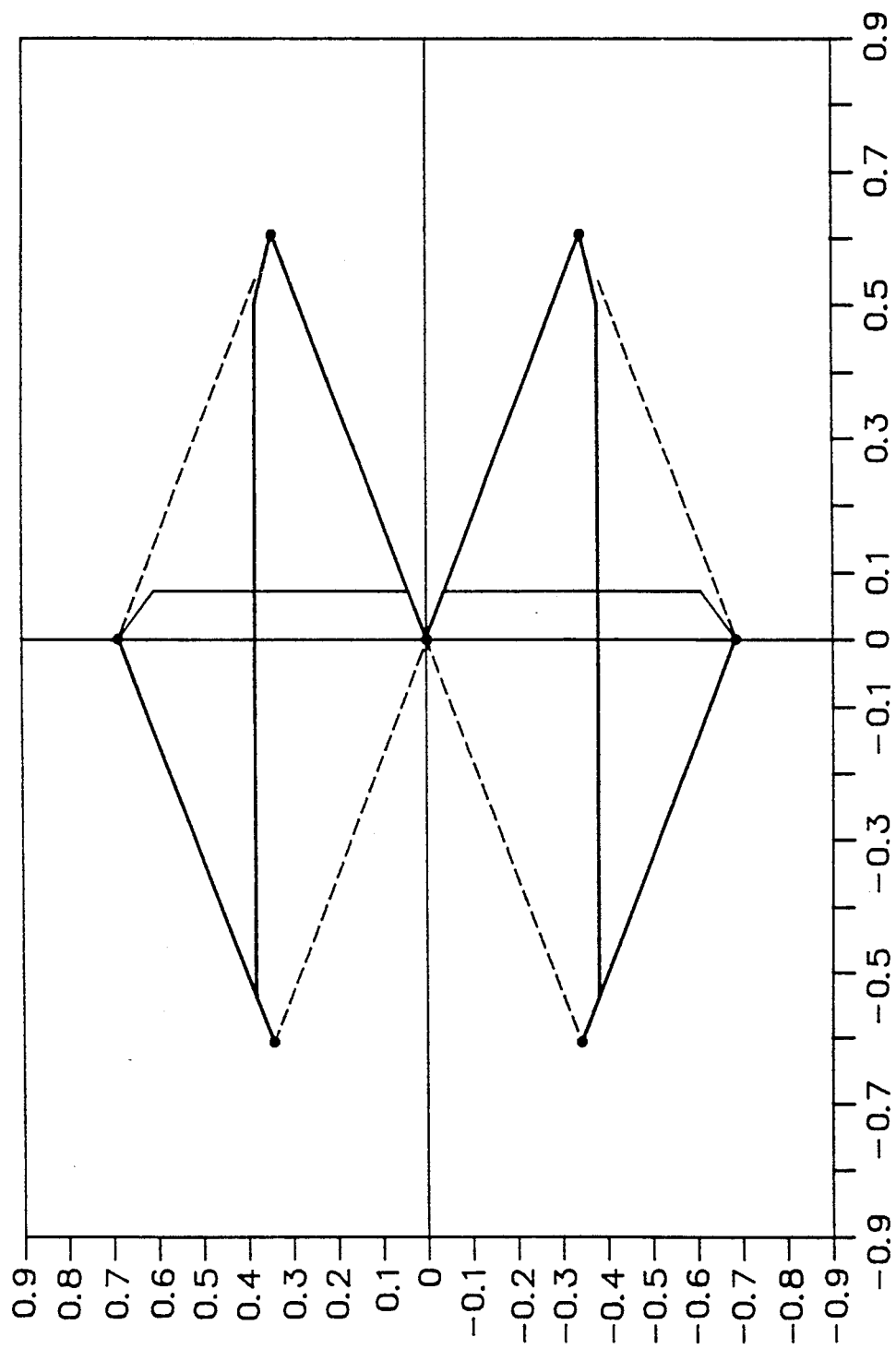
FIG. 3 is an illustration of a display according to the present invention showing delay in the green component.
Figure 4:
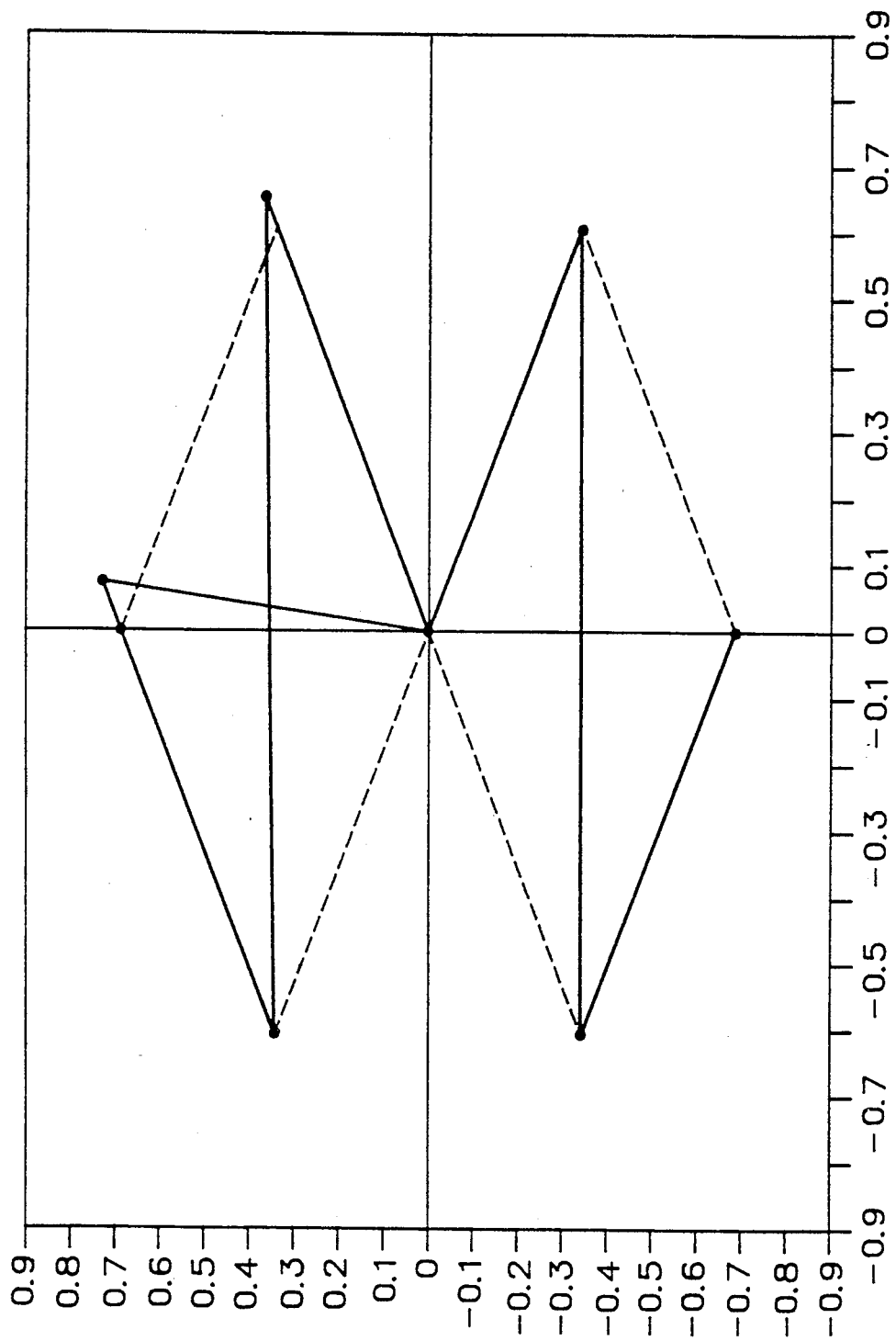
FIG. 4 is an illustration of a display according to the present invention showing an amplitude error in the blue component.
Figure 5:
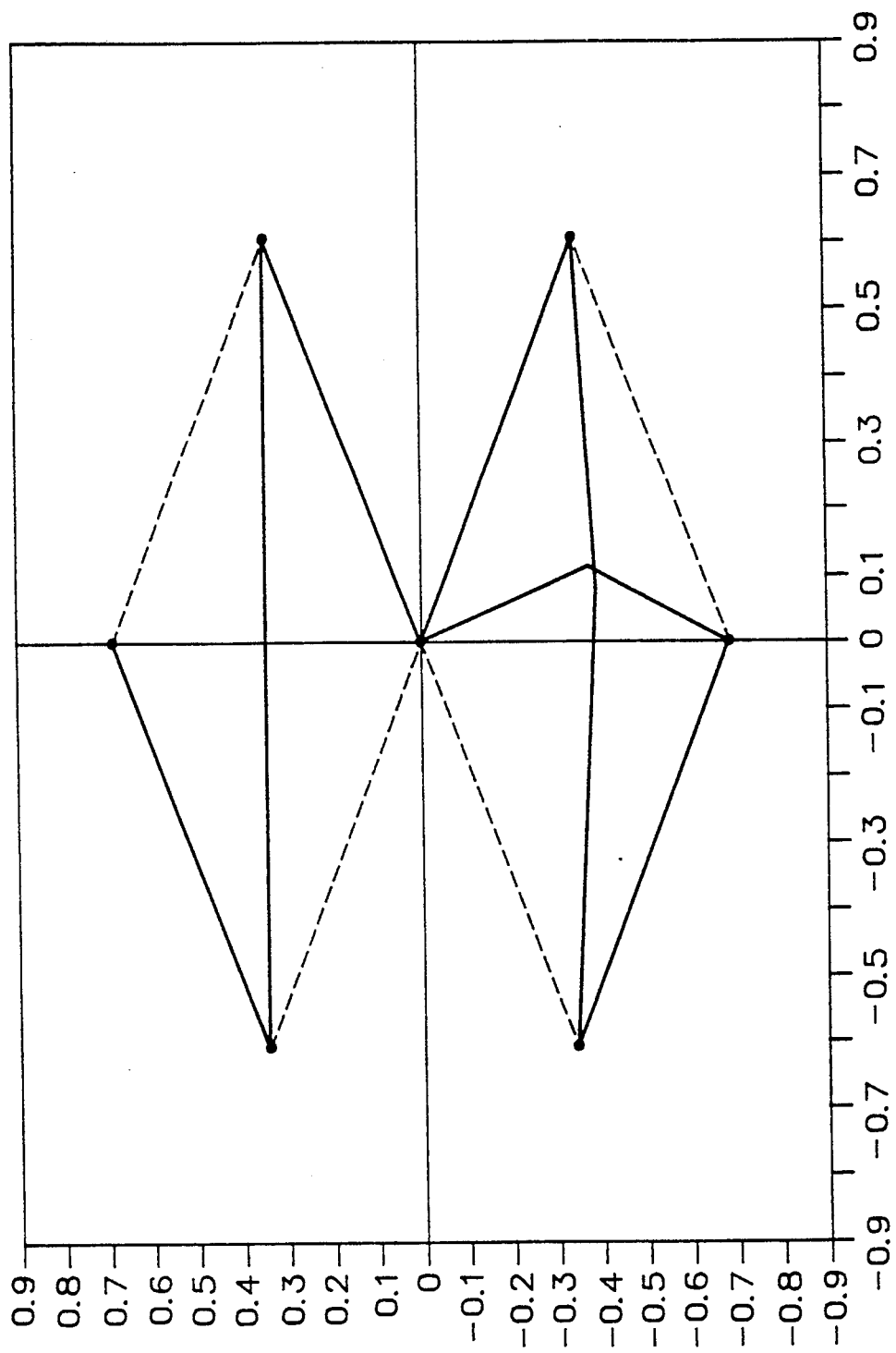
FIG. 5 is an illustration of a display according to the present invention showing a gamma error in the red component.
Figure 6:
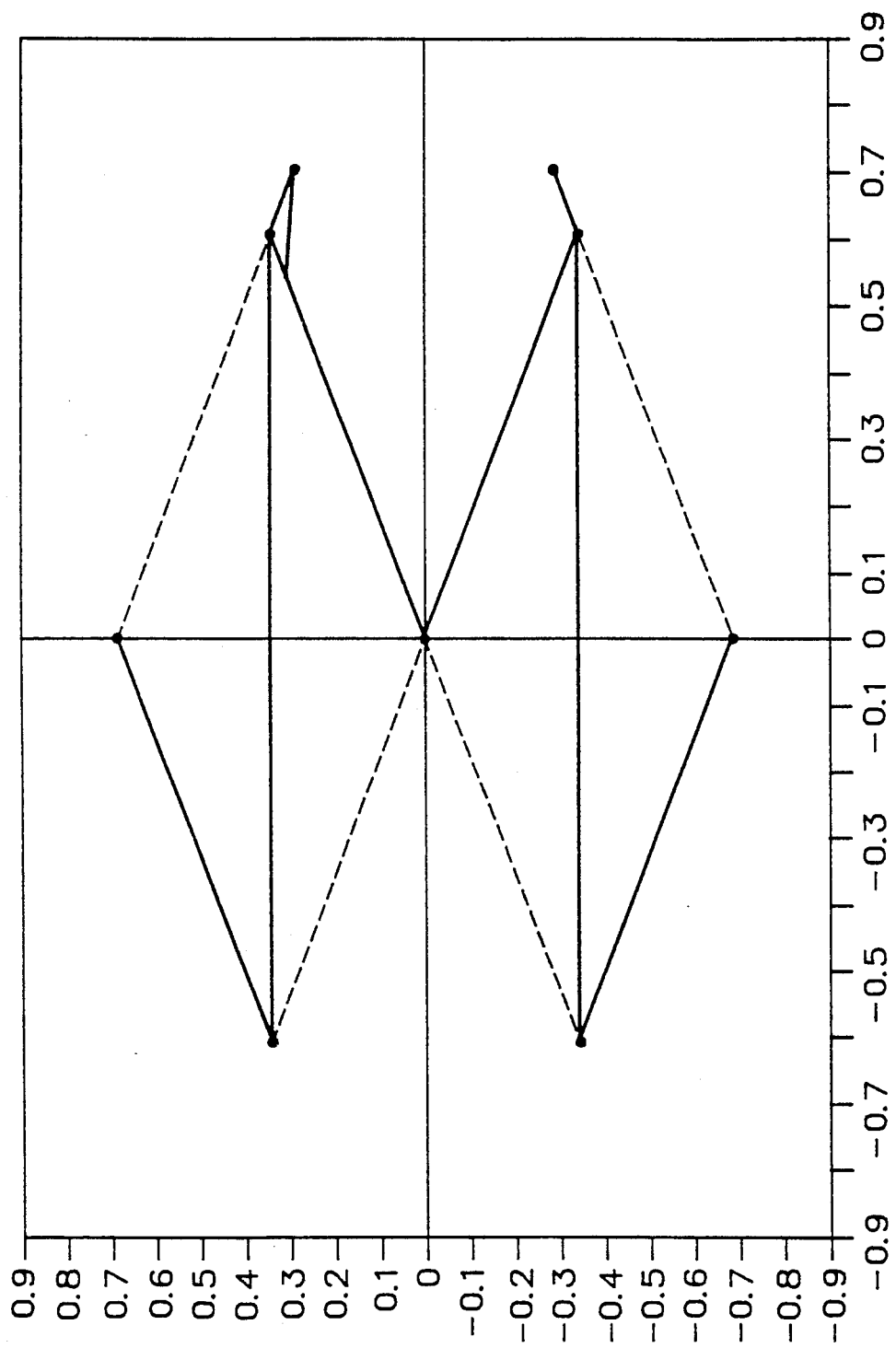
FIG. 6 is an illustration of a display according to the present invention showing a negative gamma error in the green component.

The vertical transition up the center of the display is a good indicator of a timing errors. For example, as shown in FIG. 3 for a green timing error, the green timing error equally affects both the upper and lower transitions. Amplitude errors cause the dots to be mislocated with respect to the defined boxes. Green amplitude errors affect both halves equally, while blue and red amplitude errors affect only their respective displays. FIG. 4 illustrates a blue gain error. Monochrome signals appear as a vertical line in the diamond display. Any nonlinear component processing, such as gamma correction, that destroys the monochrome, grey-scale tracking causes the line to deviate horizontally. FIG. 5 illustrates a red gamma error. Out of gamut signals, i.e., signals that may not be reproduced on a color picture monitor, are always outside of the diamond display boundaries. As shown in FIG. 6 a negative green component is clearly out of the diamond gamut boundary.

Thus the present invention provides a diamond display with a robust gamut limit by combining RGB input signals to form a pair of green and blue signals (G+B, −G+B) and a pair of green and red signals (−G−R, −G+R) that are alternately applied to the horizontal and vertical amplifiers of a display device.

What is claimed is:

1. An apparatus for characterizing red, green and blue components of a video signal comprising:

means for generating from the red, green and blue components two pairs of combination signals that represent a first component of the components with another of the components as a common component in one pair and a second component of the components with the common component in the other pair; and means for switching between the pairs of combination signals at the inputs of a vector display device at a rate to provide a symmetrical display of the two pairs of combination signals about an axis of symmetry such that characteristics of the first component appear in one half of the symmetrical display, characteristics of the second component appear in the other half of the symmetrical display, and characteristics of the common component appear in both halves of the symmetrical display.

2. The apparatus as recited in claim 1 wherein the generating means comprises:

means for combining the green component as the common component with the blue component as the first component to produce the one pair of combination signals; and means for combining the green component with the red component as the second component to produce the other pair of combination signals.

3. The apparatus as recited in claim 1 wherein the symmetrical display comprises a diamond shaped graticule for each half that defines a color gamut range for the red, green and blue components.

* * * * *